United States Patent Office 3,330,840
Patented July 11, 1967

3,330,840
DERIVATIVES OF METHYL 9,9-DIMETHOXYNONANOATE
Everett H. Pryde, John C. Cowan, and Danny Joe Moore, Peoria, Ill., assignors to the United States of America as represented by the Secretary of Agriculture
No Drawing. Filed June 8, 1964, Ser. No. 373,589
6 Claims. (Cl. 260—340.9)

ABSTRACT OF THE DISCLOSURE

Superior plasticizers for PVC are produced by selectively alcoholyzing either the acetal function or the ester function of methyl 9,9-dimethoxynonanoate or by transacetalizing the same with ethylene glycol or with 2-methoxyethanol.

---

A nonexclusive, irrevocable, royalty-free license in the invention herein described, throughout the world for all purposes of the United States Government, with the power to grant sublicenses for such purposes, is hereby granted to the Government of the United States of America.

This invention relates to novel ester-acetal derivatives of azelaaldehydic acid and more specifically to those of the dimethyl acetal of methyl azelaaldehydate, which derivatives have unexpectedly been discovered to be excellent low temperature plasticizers for poly(vinyl chloride) (PVC) to which they impart much better low-temperature flexbility than that provided by the dialkyl esters such as dioctyl phthalate. In addition, we have discovered that the dimethyl acetal group, which is present in the most highly preferred of our novel derivatives, apparently also confers a valuable measure of heat stability to polyvinyl chloride, an increased improved stability to heat being conferred even on unstabilized PVC, i.e., PVC containing no conventional epoxy stabilizer additive such as an epoxidized oil.

Another aspect of our invention is the discovery of critical conditions of temperature, time, and catalyst that unexpectedly provide alcoholysis exclusively at either the acetal function or at the ester function of an ester acetal such as methyl 9,9-dimethoxynonanoate instead of the expected simultaneous alcoholysis of both the ester and the acetal functions thereof. Thus, our invention also comprises unobvious processes for selectively alcoholyzing either the ester function or the acetal function of ester-acetals such as methyl 9,9-dimethoxynonanoate. In this connection it is pointed out that whereas the stability of an acetal function in alkaline or neutral media is known to permit reaction of other functions of an acetal compound without effects on the acetal group, it is also known that in the presence of an acidic catalyst, the acetal group, like an ester group, readily undergoes alcoholysis, and is subject to cleavage. Thus, an acid-catalyzed alcoholysis of an ester-acetal compound such as methyl 9,9-dimethoxynonanoate would be expected to involve concurrent alcoholysis of both the ester function and of the acetal function, as does actually occur when said ester acetal is alcoholyzed for prolonged periods and especially when the alcoholysis is conducted, as is customary at the reflux temperature of the alcohol. For example, after methyl 9,9-methoxynonanoate was refluxed with 1-hexanol at 155° C. for 4 hours in the presence of KHSO$_4$ we found that a 21.2 percent alcoholysis of both the ester and of the acetal functions thereof had occurred. Our invention, therefore, also comprises the discovery that when the temperature is held between 50°–75° C., and the reaction time is limited to not over 4 hours, the alcoholysis is confined exclusively to the acetal group.

Poly(vinyl chloride) is one of the very widely used synthetic resins, but its inflexibility and its extreme brittleness at low temperature necessitates incorporating a plasticizer. The most widely used plasticizers are dialkyl esters such as dioctyl phthalate and dioctyl sebacate, but the extent of plasticization they provide still leaves much room for improvement, especially at lower temperatures.

The discovery in our particular ester-aldehyde compounds of plasticizing effects distinctly exceeding those of dioctyl phthalate coupled with the presence of the extremely rare ability to plasticize PVC even at low temperature is quite surprising in view of the teachings and data of Izumi, Kogyo Kagaku Zasshi 60: 730 (1957), see Chem. Abstr. 53: 9695 (1959) who tested the plasticizing action on PVC of a product obtained by ozonizing olive oil dissolved in acetic acid (which solvent permits the ozonization reaction to reach only about 50 percent of completion for maximum aldehyde content), then thermally decomposing his ozonides to give a mixed intermediate comprising a monoaldehydic glyceride plus fatty acid plus aliphatic aldehyde rather than substantially all aldehydes as are obtained when fatty derivatives are ozonized in methanol and then reduced catalytically instead of thermally. Upon esterifying and acetalizing the intermediate product with a lower alcohol, Izumi's crude product was a mixture comprising a glyceride

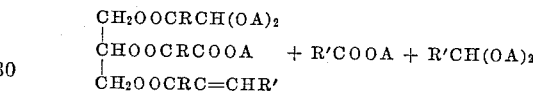

from which the volatiles were then distilled off to give products obviously having more ester than acetal functionality. Although Izumi's data show that his methyl and isoamyl ester acetals decreased the tensile strength of polyvinyl chloride much less than did dioctyl phthalate (control), his methyl ester-acetal product gave a modulus of elongation value of 3560 p.s.i. while his homologous isoamyl product gave a modulus value of 2335 p.s.i., both compared with a dioctyl phthalate value of 1423 p.s.i., a lowered modulus value representing a greater degree of plasticization. It is clear from the above modulus values that Izumi's ester-acetals are distinctly inferior to the dioctyl phthalate and have very little plasticizing activity. In view of the well known plasticizing action of ester functionality, one skilled in the art could therefore conclude from Izumi's results that the acetal function gives extremely poor plasticizer properties and that related compounds having even more acetal functionality would have little if any plasticizing action on PVC. Thus, it was quite surprising to find that our novel esters, acetals, and enol ether compounds provide exceptional plasticization of polyvinyl chloride.

One object of our invention is the preparation of a novel class of high boiling polyfunctional compounds characterized by an ester group at one end and an acetal group at the opposite end.

Another object is the preparation of PVC-compatible polyfunctional ester-acetals and enol ethers, the aldehyde functions of which, considering an oxidative series, are intermediate between a hydroxyl and a carboxyl group (the said groups being known to greatly lessen the compatability of a compound towards PVC), which novel polyfunctional compounds surprisingly are compatible with PVC at about a 32 percent level of incorporation. Along a related line of reasoning, since it is known that the ether oxygen obtained by replacing the hydrogen of an alcohol group by an aliphatic hydrocarbon radical is comparable to a methylene group in inhibiting the solvating action of an ester group on PVC (Frissell, Modern Plastics 38: 232

(1961), it would not be obvious that our ester-aldehydes of the type

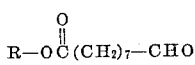

where R=butyl or preferably hexyl, or esters of azelaaldehydic dimethyl acetals of the type

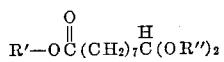

where R' is a lower aliphatic hydrocarbon radical and R'' is the methyl radical would be more compatible with PVC than hydroxyl and carboxyl-containing compounds or than a PVC-incompatible branched chain fatty acid ester having a structure of the type

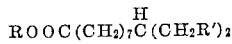

The above and other objects and advantages of our invention will be more clearly understood by those skilled in the art from a reading of the following specification and claims.

In accordance with the several aspects of our invention we have now discovered that alcoholysis (transesterification) exclusively of the ester function of methyl 9,9-dimethoxynonanoate without concommitant alcoholysis (transacetalization) of the acetal group can be obtained by refluxing the 9,9-dimethoxynonanoate at ca. 100° C. with an equimolar amount of an alcohol in the presence of a trace of sodium methoxide catalyst. Conversely, we have also discovered that alcoholysis exclusively of the acetal group of the dimethyl acetal can be obtained by refluxing the above ester-acetal with a 100 percent excess of an alcohol at temperatures not above 50–75° C. for not over about 4 hours in the presence of an acidic catalyst such as potassium acid sulfate. As shown by the examples and Table I, higher reaction temperatures and longer heating periods also result in an extensive alcoholysis of the acetal function. It should be pointed out that thorough washing of the crude product prior to distillation is required for removing traces of any kind of acid in order to avoid subsequent cracking of the product that would lead to decreased purity and lowered yield of the desired acetal plasticizer.

TABLE I.—EFFECT OF REACTION CONDITIONS ON ACETAL ALCOHOLYSIS

| Reaction Temperature, ° C. | Reaction Time, 4 hr. | | Reaction Time, 7 hr. | |
|---|---|---|---|---|
| | Total Conversion, Percent | Ester-Acetal, Percent | Total Conversion, Percent | Ester-Acetal, Percent |
| 50 | 82.5 | 0.0 | 87.0 | 0.0 |
| 75 | 95.0 | 0.0 | 95.6 | 0.8 |
| 85 | 94.5 | 2.9 | 97.0 | 3.5 |
| 115 | 88.0 | 4.4 | 92.5 | 18.0 |
| 155 | 92.0 | 21.2 | 92.5 | 33.0 |

Thus, by unexpectedly achieving preferential alcoholysis of either the acetal or the ester function of methyl 9,9-dimethoxynonanoate we have obtained commercially attractive yields of the following novel and highly useful plasticizers, namely:

(1) Lower alkyl ester acetals derived from an alkyl ester acetal such as methyl 9,9-dimethoxynonanoate and ethyl 9,9-dimethoxynonanoate or any lower alkyl ester acetal wherein the alkyl group of the acetal comes from an alcohol having a lower boiling point than the alcohol which by the instant invention is to be reacted with the ester acetal starting material, said ester acetals having the formula

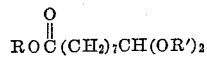

wherein R is a $C_1-C_8$ alkyl radical and R' is restricted to methyl and 2-methoxyethyl, which ester-acetals are compatible with PVC at about a 32 percent level of incorporation, it being emphasized, however, that when R' is other than methyl or 2-methoxyethyl, e.g., ethyl, butyl, hexyl, or 2-ethylhexyl, the indicated di-lower alkyl esteracetals were found to be distinctly incompatible with PVC.

(2) Cyclic acetals, e.g., methyl 8-(1,3-dioxolan-2-yl) octanoate from the transacetalization of 9,9-dimethoxynonanoate with ethylene glycol and having the formula

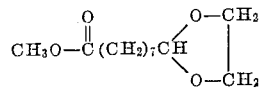

(3) 2-ethylhexyl 9,9-bis(2-methoxyethoxy)nonaniate from transacetalization of 9,9-dimethoxynonanoate with 2-methoxyethanol, which novel ester-acetal has the formula

(4) Eethylene bis(9-methoxy-8-nonenoate), e.g., the enol ether from cleavage of ethylene bis(9,9-dimethoxynonanoate) and having the formula

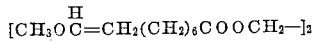

Methxy azelaldehydate (MAZ) having the structure $CH_3OOC(CH_2)_7CHO$ is a well known major product obtained from the ozonolysis of methyl oleate. MAZ may also be isolated in the form of its dimethyl acetal, namely methyl 9,9-dimethoxynonanoate having the formula

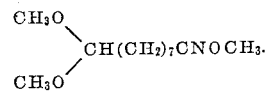

Obviously, one of the requisites of any useful plasticizer for PVC is compatibility therewith at a high level of incorporation. Our most highly preferred plasticizers for PVC were found to be compatible at a 32 percent level of incorporation based on the complete formulation. Although butyl azelaaldehydate $C_4H_9$—$OOC(CH_2)_7CHO$ was found to be compatible with PVC at the 32 percent level, it is inoperative because it deteriorates during the molding operation. The same level of compatibility was found with lower alkyl esters of the dimethyl acetal

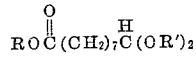

where R is lower alkyl but only when R' is methyl or 2-methoxyethyl. Thus, whereas the alkyl esters of the dimethyl acetal are compatible, the corresponding esters of the dibutyl, diethyl, dihexyl, and di-2-ethylhexyl acetals were found to be so incompatible with PVC as to make them unusable.

For evaluation, our novel plasticizers were added at the level of 32 parts to each 68 parts of a dry mixture consisting of 65 parts (based on the whole formulation) of a commercial PVC resin ("Geon 101"), 2 parts of a barium-cadmium complex made by Argus Chem'l. Corp. and sold under the trademark "Mark M," and 1 part "Paraplex G–60" epoxidized oil stabilizer available from Rohm and Haas. The mixture was then milled at 160° C. for about 8 minutes, and then the sheeted resin was molded at 160° C. for 10 hours without pressure in a standard 6 x 6 0.075 in. mold, pressed at 1000 p.s.i. for 10 minutes at 160° C., and finally cooled under pressure. Unlike PVC plasticized with dioctyl phthalate, PVC plasticized with butyl azelaaldehydate degraded rapidly during the molding and, accordingly butyl azelaaldehydate is not suitable as a plasticizer. On the other hand, PVC plasticized with our dimethyl acetals, particularly the 2-ethylhexyl 9,9-dimethoxynonanoate, showed exceptional stability and these plasticizers are highly preferred.

In further accordance with our invention, equilibrated PVC specimens containing our novel plasticizers were tested on an Instron tester at a jaw separation rate of 20 inches/minute by standard ASTM methods for their effect on tensile strength, elongation, and 100 percent torsional modulus. The particularly important parameter of torsional modulus as a function of temperature and indicating the extent of low temperature flexibility was determined on a Clash-Berg stiffness tester as specified in ASTM D1043-51. Heat stability was evaluated by inspecting molded specimens ovened at 160° C. for color with a GE visible light spectrophotometer at a wavelength of 600 mμ. Migration of the plasticizers from the resin was evaluated by the method of Geenty, India Rubber World 126: 646 (1952) and the volatility by the method set forth as ASTM D1203-55. The results are set forth in Tables II–V.

It will be seen from the following specific examples and from the tables that n-butyl alcohol, n-hexyl alcohol, n-octyl alcohol, 2-ethylhexyl alcohol, ethylene glycol, glycerol, and 2-methoxyethanol were reacted with respectively the acetal function and the ester function of methyl 9,9-dimethoxynonanoate. In some preparations the two functions were differently alcoholyzed.

EXAMPLE 1

*Butyl 9,9-dimethoxynonanoate*

Methyl 9,9-dimethoxynonanoate 55.3 g. (0.238 mole), n-butanol 400 ml. and sodium methoxide 0.12 g. were heated at 100° C. in a 3-necked round-bottom flask fitted with a capillary inlet for nitrogen, a thermometer, and a distillation head. After 10 hours of heating with periodic removals of methanol, the catalyst was neutralized with glacial acetic acid. The transesterified product was dissolved in methylene chloride and the solution washed with water until neutral. After drying over anhydrous sodium sulfate, the solvent was stripped off. After distillation at reduced pressure, a 75 percent yield of 99+ percent pure butyl 9,9-dimethoxynonanoate was obtained, illustrating the marked selectivity of alcoholysis at the ester group under the given conditions.

EXAMPLE 2

*Methyl 9,9-bis(1-hexoxy)nonanoate*

Methyl 9,9-dimethoxynonanoate (25 g.; 0.108 mole), n-hexyl alcohol (44.14 g.; 0.432 mole), and potassium acid sulfate (0.1 g.) were heated in round bottomed 3-necked flask fitted with nitrogen ebullator, thermometer, and steam heated condenser top having a take-off head to remove byproduct methanol. After 4 hours at 50° C. the product was processed as in Example 1. Conversion to methyl 9,9-bis(1-hexoxy)nonanoate was 83 percent, and no conversion to 1-hexyl 9,9-bis(1-hexoxy)nonanoate was found to have taken place.

EXAMPLE 3

Methyl 9,9-dimethoxynonanoate (15.0 g.; 0.065 m.), n-hexyl alcohol (26.15 g.; 0.260 m.), and potassium acid sulfate (0.1 g.) were treated as in Example 2 excepting as to temperature. After 4 hours at 75° C. the conversion to methyl 9,9-bis(1-hexoxy)nonanoate was 94.5 percent and no 1-hexyl 9,9-bis(1-hexoxy)nonanoate was present.

EXAMPLE 4

Methyl 9,9-dimethoxynonanoate (15.0 g.; 0.065 m.), n-hexyl alcohol (26.15 g.; 0.260 m.), and potassium acid sulfate, 0.1 g. were treated as in Example 2, excepting as to temperature. After 4 hours at 85° C. the conversion to methyl 9,9-bis(1-hexoxy)nonanoate was 91.6 percent and the conversion to 1-hexyl 9,9-bis(1-hexoxy)nonanoate was 2.9 percent of theory. It is seen that transesterification of the ester function begins only at a temperature of about 85° C.

EXAMPLE 5

Methyl 9,9-dimethoxynonanoate (25.0 g.; 0.108 mole), n-hexyl alcohol (44.14 g.; 0.432 mole), and potassium acid sulfate (0.1 g.) were treated as in Example 2 excepting as to temperature. After 4 hours at 115° C., conversion to the desired methyl 9,9-bis(1-hexoxy)nonanoate was 83.5 percent and conversion to 1-hexyl 9,9-bis(1-hexoxy)nonanoate was 4.5 percent.

EXAMPLE 6

Methyl 9,9-dimethoxynonanoate (15.0 g.; 0.065 m.), n-hexyl alcohol (26.15 g.; 0.26 m.), and potassium acid sulfate (0.1 g.) were treated as in Example 2 excepting as to temperature. After 4 hours at 155° C., conversion to methyl 9,9-bis(1-hexoxy)nonanoate was 71 percent and conversion to 1-hexyl 9,9-bis(1-hexoxy)nonanoate was 21 percent.

EXAMPLE 7

*Methyl 8-(1,3 dioxolan-2-yl)octonoate*

Methyl 9,9-dimethoxynonanoate 26 g. (0.112 mole), ethylene glycol 25.0 g. (0.379 mole), and KHSO$_4$ (0.15 g.) were heated to 90° C. in the flask of Example 1. Heating was maintained for 2 hours with periodic removals of ethanol. The product was dissolved in methylene chloride, neutralized, and washed with water. After drying, the solvent was stripped off, and the crude was distilled under reduced pressure to yield 78.3 percent of theory of 99+% pure methyl 8-(1.3-dioxolan-2-yl)octanoate. The preparation of this previously unknown compound illustrates the selectivity of the alcoholysis at the acetal function.

EXAMPLE 8

*Methyl 9,9-bis(1-butoxy)nonanoate*

Methyl 9,9-dimethoxynonanoate (23.2 g.; 0.1 mole), n-butyl alcohol (81.0 g.; 1.09 moles), and potassium acid sulfate (0.15 g.) were heated at 95–100° C. in a 3-necked round-bottom flask fitted with thermometer, capillary inlet for nitrogen, and steam heated condenser topped by a takeoff head. After 4 hours of heating with periodic removals of methanol, the catalyst was removed by filtration. The reaction mixture was dissolved in methylene chloride and washed with three 100 ml. portions of water. After drying over "Drierite," the solvent and excess n-butyl alcohol were removed under reduced pressure. Yield: 92.2% of theory, B.P. 127–129° C./0.09 mm. Hg.

EXAMPLE 9

*Methyl 9,9-bis(1-octadecanoxy)nonanoate*

Methyl 9,9-dimethoxynonanoate (27.0 g., 0.116 mole), n-octadecanol (94.5 g., 0.35 mole, and potassium acid sulfate (0.15 g.) were heated for 4 hours at 100–135° C./30 mm. Hg in a 3-necked round-bottom flask fitted with a thermometer, capillary nitrogen inlet, and takeoff head. The crude reaction product was then dissolved in methylene chloride, filtered to remove catalyst, and washed with three 100 ml. portions of water. After drying over "Drierite," the excess octadecanol, and unreacted methyl 9,9-dimethoxynonanoate were removed under reduced pressure. Yield of methyl 9,9-bis(1-octadecanoxy) nonanoate, a white solid, melting at 38.5–39.5° C., was 80% of theory.

EXAMPLE 10

*Butyl 8-(1,3-dioxolan-2-yl)octanoate*

Butyl 9,9-dimethoxynonanoate of Example 1 (22.5 g., 0.082 mole), ethylene glycol (25.0 g., 0.403 mole), and potassium acid sulfate catalyst were heated in a 3-necked round-bottom flask fitted with thermometer, capillary nitrogen inlet and a take-off head. After heating for 6 hours at 95–100° C., the reaction mixture was cooled, filtered to remove the catalyst, and dissolved in diethyl ether. The ethereal solution was washed with three 100 ml. portions of water and then was dried over anhydrous sodium sulfate. Diethyl ether was removed under reduced pressure. Yield of butyl 8-(1,3-dioxolan-2-yl)octanoate was 85.4% of theory.

EXAMPLE 11

*Butyl 8-(1,3-dioxolan-2-yl)octanoate*

Methyl 8-(1,3-dioxolan-2-yl)octanoate (27.1 g.; 0.119 mole), of Example 7, n-butyl alcohol (97 g., 0.76 mole), and sodium methoxide (0.1 g.) were heated at 95–106° C. in a 3-necked round-bottom flask fitted with thermometer, capillary inlet for nitrogen, and take-off head for 8 hours. The reacted mixture was cooled and the catalyst neutralized with glacial acetic acid. The mixture was taken up in methylene chloride and washed with water until neutral. After drying over "Drierite" the solvent and excess butyl alcohol were stripped off under reduced pressure. Yield of butyl 8-(1,3-dioxolan-2-yl)octanoate was 86.4% of theory, B.P. 115° C./0.1 mm. Hg.

EXAMPLE 12

*2-ethylhexyl 9,9-dimethoxynonanoate*

Methyl 9,9-dimethoxynonanoate (47.0 g., 0.202 mole), 2-ethylhexanol (91.74 g., 0.705 mole), and sodium methoxide (0.1 g.) were heated in a reaction flask fitted with capillary nitrogen inlet, thermometer, and a 4 in. Vigreux topped with a take-off head. After 8 hours at 120–150° C. the reaction mixture was cooled, the catalyst neutralized with glacial acetic acid, and the material dissolved in methylene chloride. After washing with water until neutral to test paper, the methylene chloride solution was dried, and the solvent and excess 2-ethylhexanol were stripped off under reduced pressure. Yield of 2-ethylhexyl 9,9-dimethoxynonanoate was 87.2% of theory, B.P. 138° C./0.06 mm. Hg.

EXAMPLE 13

*2-ethylhexyl 8-(1,3-dioxolan-2-yl)octanoate*

Methyl 8-(1,3-dioxolan-2-yl)octanoate (19.5 g., 0.084), 2-ethylhexanol (128.0 g., 0.985 mole), and sodium methoxide were heated for 8 hours at 95–100° C. in the reaction flask of Experiment 10. Then the product was taken up in methylene chloride and washed with water until neutral to test paper. After drying over "Drierite," the solvent and excess 2-ethylhexanol were stripped off under reduced pressure. Yield was 88.0% of theory, B.P. 135–138° C./0.05 mm. Hg.

EXAMPLE 14

*Ethylene bis[8-(1,3-dioxolan-2-yl)octanoate]*

Methyl 8-(1,3-dioxolan-2-yl)octanoate (49.5 g., 0.215 mole), ethylene glycol (6.0 g., 0.193 mole of OH), and sodium methoxide (0.1 g.) were heated at 128–200° C./25 mm. Hg, in a 3-necked round-bottom flask fitted with capillary nitrogen inlet, thermometer, and 6-inch helices-packed column topped with take-off head. After 8 hours the reaction mixture was cooled, the catalyst neutralized with glacial acetic acid, and the material dissolved in methylene chloride. After washing with water until neutral, the methylene chloride solution was dried, and the solvent and unreacted methyl 8-(1,3-dioxolan-2-yl)octanoate were stripped off under reduced pressure. Yield was 90.8% of theory, M.P. 67.5–68.5.

EXAMPLE 15

*Methyl 9-methoxy-8-nonanoate*

Methyl 9,9-dimethoxynonanoate (69.12 g., 0.298 mole), and potassium acid sulfate (0.20 g.) were heated in the previously described 3-necked round-bottom flask at 135–150° C. under reduced pressure for 7 hours. The product was taken up in methylene chloride, washed, freed of water, filtered, and the methylene chloride stripped off. The product was flask distilled leaving a polymeric residue of 23.3 percent based on the starting material. The distillate, containing 70.3 percent of cracked product, was redistilled on a Podbielniak spinning band to give a main fraction boiling at 107–109° C./4.5 mm. Hg which assayed 98.6 percent of theory of methyl 9-methoxy-8-nonanoate. This enol ether having the formula $CH_3OCH=CH(CH_2)_6COOCH_3$ was characterized by having a $n_D^{30}=1.4434$ and a hydroxylamine value of 205.0.

*Analysis.*—Calc. for $C_{11}H_{20}O_3$: C, 66.05; H, 10.08. Found, C, 66.14; H, 10.06.

EXAMPLE 16

*Neopentylglycol bis(9,9-dimethoxynonanoate)*

Methyl 9,9-dimethoxynonanoate (45.0 g.; 0.194 mole), neopentyl glycol (6.71 g.; 0.0645 mole), and sodium methoxide (0.1 g.) were heated for 10 hours at 100–110° C./75–0.2 mm. Hg. After cooling the reacted mixture, excess sodium methoxide was neutralized with glacial acetic acid. The neutralized mixture was taken up in methylene chloride and washed with water. After drying over "Drierite" the solvent and unreacted methyl 9,9-dimethoxynonanoate were removed under reduced pressure. The yield of clear liquid neopentylglycol bis(9,9-dimethoxynonanoate) was 92.4 percent of theory, $n_D^{30}=1.4483$.

EXAMPLE 17

*2-ethylhexyl 9,9-bis(2-methoxyethoxy)nonanoate*

2-ethylhexyl 9,9-dimethoxynonanoate (33.0 g.; 0.142 mole), 2-methoxyethanol (193.3 g.; 2.54 mole), and potassium acid sulfate (0.1 g.) were heated in a 3-necked round-bottomed flask fitted with nitrogen ebullator, thermometer, and steam heated condenser topped with take-off head for 4 hours at 80° C. Reaction mixture was worked up as in the preceding examples. The yield of product was 92.7 percent $n_D^{30}=1.4439$.

EXAMPLE 18

*Ethylene bis(9-methoxy-8-nonanoate)*

Ethylene bis(9,9-dimethoxynonanoate) (35.0 g., 0.076 mole) and p-toluenesulfonic acid (0.1 g.) were placed in a 3-neck round-bottom flask fitted with a nitrogen ebullator, thermometer and take-off head and heated for 8 hours at 150–175° C. and progressively reduced pressure (30 mm. 12 mm. Hg). The product was taken up in methylene chloride, washed, freed of water, filtered, the methylene chloride stripped off, and then distilled to give 23.25 g. of ethylene bis(9-methoxy-8-nonanoate). The yield of the enol ether was 58 percent of theory.

TABLE I.—ESTER-ACETAL DERIVATIVES OF AZELAALDEHYDIC ACID

| Ester Group | Acetal Group | Formula | B.P., ° C./mm. Hg |
| --- | --- | --- | --- |
| Methyl | Pentaerythritol | $\left[ CH_3OCO(CH_2)_7CH \begin{array}{c} OCH_2 \\ OCH_2 \end{array} \right]_2 C$ | [1] 37.5–38.0 |
| 2-methoxyethyl | do | $\left[ CH_3OCH_2CH_2OCO(CH_2)_7CH \begin{array}{c} OCH_2 \\ OCH_2 \end{array} \right]_2 C$ | |

[1] MP, ° C.

TABLE II.—ESTER-ACETAL DERIVATIVES OF AZELAALDEHYDIC ACID

| Ester Group | Acetal Group | Formula | B.P., °C./mm. Hg |
|---|---|---|---|
| Butyl | None (azelaaldehydate) | n-$C_4H_9OCO(CH_2)_7CHO$ | 91/0.05 |
|  | Methyl | n-$C_4H_9OCO(CH_2)_7CH(OCH_3)_2$ | 96–97/0.06 |
|  | Ethylene | n-$C_4H_9OCO(CH_2)_7CH\begin{smallmatrix}OCH_2\\ \\OCH_2\end{smallmatrix}$ | 115/0.10 |
| 2-ethylhexyl | Methyl | $CH_3(CH_2)_3CH(C_2H_5)CH_2OCO(CH_2)_7CH(OCH_3)_2$ | 138/0.06 |
|  | Ethylene | $CH_3(CH_2)_3CH(C_2H_5)CH_2OCO(CH_2)_7CH\begin{smallmatrix}OCH_2\\ \\OCH_2\end{smallmatrix}$ | 135–138/0.06 |
|  | 2-methoxyethyl | $CH_3(CH_2)_3CH(C_2H_5)CH_2OCO(CH_2)_7CH(OCH_2CH_2OCH_3)_2$ |  |
| Ethylene | Methyl | $[-CH_2OCO(CH_2)_7CH(OCH_3)_2]_2$ | 210–213/0.06 |
|  | 9-methoxy-8-nonanoate | $[-CH_2OCO(CH_2)_6CH=CHOCH_3]_2$ | 210–213/0.06 |
|  | Ethylene | $[-CH_2OCO(CH_2)_7CH\begin{smallmatrix}OCH_2\\ \\OCH_2\end{smallmatrix}]_2$ | [1] 67.5–68.5 |
| Glyceryl | Methyl | $\begin{smallmatrix}CH_2O-\\CHO-\\CH_2O-\end{smallmatrix}[-CO(CH_2)_7CH(OCH_3)_2]_3$ |  |
| Neopentyl glycol | do | $\begin{smallmatrix}CH_3\\ \\CH_3\end{smallmatrix}C\begin{smallmatrix}CH_2O-\\ \\CH_2O-\end{smallmatrix}[-CO(CH_2)_7CH(OCH_3)_2]_2$ |  |

[1] M.P., °C.

TABLE III.—PROPERTIES OF PVC PLASTICIZED WITH AZELAALDEHYDIC ACID DERIVATIVES

| Ester Group | Acetal Group | Torsional Stiffness Temperature | | Migration, 14 days at 23° C., percent [1] | Volatility, 24 hr. at 70° C., percent [1] |
|---|---|---|---|---|---|
|  |  | $T_{135,000}$ | $T_{10,000}$ |  |  |
| Butyl | (Azelaaldehydate) | −24.0 | 11.0 | 11.6 | 13.7 |
|  | Methyl | −45.0 | −12.0 | 14.9 | 20.2 |
|  | Ethylene | −45.0 | −16.0 | 16.2 | 19.6 |
| 2-ethylhexyl | Methyl | −54.0 | −16.0 | 17.5 | 13.7 |
|  | Ethylene | −46.5 | −13.0 | 16.3 | 8.2 |
|  | 2-methoxyethyl | −46.0 | −20.0 | 16.4 | 3.0 |
| Ethylene | Methyl | −30.0 | +2.0 | 6.6 | 12.3 |
|  | (9-methoxy-8-nonanoate) | −44.0 | −12.0 | 17.4 | 1.3 |
|  | Ethylene | −24.0 | +6.0 | Exudate too heavy |  |
| Neopentyl glycol | Methyl | −28.5 | −7.0 | 7.6 | 0.5 |
| Glyceryl | do | −20.0 | +4.0 | 3.4 | 1.2 |
| Methyl | Pentaerythritol | −12.0 | +12.0 | Exudate too heavy |  |
| 2-methoxyethyl | do | −10.0 | 10.0 | Exudate too heavy |  |
| DOP |  | −29.5 | 0.0 | 3.9 | 1.7 |
| Di-(ethylhexyl) azelate |  | −53.0 | −14.0 | 18.3 | 1.6 |

[1] Based on total weight of sheet and plasticizer.

TABLE IV.—MECHANICAL PROPERTIES OF PVC PLASTICIZED WITH AZELAALDEHYDIC ACID DERIVATIVES

| Ester Group | Acetal Group | Mechanical Properties | | |
|---|---|---|---|---|
|  |  | Tensile, p.s.i. | Modulus 100%, p.s.i. | Elongation, Percent |
| Butyl | (Azelaaldehydate) | 2,780 | 1,530 | 300 |
|  | Methyl | 2,600 | 840 | 355 |
|  | Ethylene | 2,570 | 720 | 395 |
| 2-ethylhexyl | Methyl | 2,520 | 900 | 370 |
|  | Ethylene | 2,370 | 860 | 350 |
|  | 2-methoxyethyl | 2,310 | 690 | 370 |
| Ethylene | Methyl | 2,990 | 1,180 | 240 |
|  | (9-methoxy-8-nonanoate) | 2,600 | 775 | 340 |
|  | Ethylene | 2,780 | 1,230 | 340 |
| Neopentyl glycol | Methyl | 2,550 | 975 | 270 |
| Glyceryl | do | 2,940 | 1,240 | 330 |
| Methyl | Pentaerythritol | 2,650 | 2,740 | 1,540 | 1,680 | 315 | 270 |
| 2-methoxyethyl | do | 2,825 | 1,520 | 280 |
| DOP |  | 2,570 | 1,150 | 365 |
| Di-(2-ethylhexyl) azelate |  | 2,420 | 960 | 340 |

TABLE V.—LIGHT STABILITY (WATHER-OMETER) OF PVC PLASTICIZED WITH AZELAALDEHYDIC ACID DERIVATIVES

| Ester Group | Acetal Group | Hours to Failure or Change Because of— | | | |
|---|---|---|---|---|---|
| | | Spotting | Discoloration | Hardening | Tack Formation |
| Butyl | (Azelaaldehydate) | | 0 | 24 | 24 |
| | Methyl | 548 | 548 | 72 | >648 |
| | Ethylene | >648 | >648 | 254 | >648 |
| 2-ethylhexyl | Methyl | >600 | 470 | 408 | >600 |
| | Ethylene | >648 | >648 | 548 | [1] 548 |
| | 2-methoxyethyl | >264 | 264 | 240 | 192 |
| Ethylene | Ethylene | >600 | >600 | 408 | ([2]) |
| | (9-methoxy-8-nonanoate) | >648 | 648 | 216 | 72 |
| Neopentyl glycol | Methyl | >264 | 264 | 240 | 120 |
| Glyceryl | do | 600 | 552 | 312 | 312 |
| Methyl | Pentaerythritol | >648, >600 | >648, >600 | >648, >600 | [3] >648, [3] >600 |
| 2-methoxyethyl | do | >600 | >600 | >600 | ([4]) |
| DOP | | >648 | >648 | 548 | >648 |

[1] Very slight smear on surface.
[2] Dry, white exudate initially became clear and wet at 72 hr.
[3] Dry, white exudate present throughout test.
[4] Greasy exudate present throughout test.

TABLE VI.—HEAT AGING OF PVC PLASTICIZED WITH AZELAALDEHYDIC ACID DERIVATIVES PVC STABILIZED

| Ester Group | Acetal Group | Hours at 160° C. to transmission (at 600 mμ) of — | | | | |
|---|---|---|---|---|---|---|
| | | 80% | 60% | 40% | 20% | 0 |
| Butyl | Methyl | 3.5 | 6.2 | 6.5 | 6.8 | 7.0 |
| | Ethylene | 1.7 | 4.1 | 4.8 | 5.2 | 5.5 |
| 2-ethylhexyl | Methyl | 4.0 | 7.0 | 7.4 | 7.8 | 8.0 |
| | Ethylene | 1.7 | 3.9 | 5.1 | 5.6 | 6.0 |
| | 2-methoxyethyl | 2.4 | 3.1 | 3.4 | 3.5 | 3.5 |
| | 2-methoxyethyl [1] | 0.4 | 1.1 | 1.7 | 2.1 | 2.5 |
| Ethylene | Methyl | 3.7 | 4.8 | 5.3 | 5.8 | 6.9 |
| | (9-methoxy-8-nonanoate) | 1.2 | 4.0 | 5.9 | 7.2 | (>8.0) |
| | Ethylene | 1.4 | 2.6 | 3.8 | 5.4 | 7.5 |
| Neopentyl glycol | Methyl | 0.8 | 2.2 | 2.7 | 3.1 | 3.5 |
| Glyceryl | do | 1.1 | 3.2 | 4.1 | 4.7 | (>5.5) |
| Methyl | Pentaerythritol | [2] 1.1, 1.7 | 4.9, 5.2 | 5.3, 6.0 | 5.5, 6.3 | 6.6 |
| 2-methoxyethyl | do | 2.0 | 4.4 | 4.5 | 4.1 | 5.0 |
| DOP | | 2.9 | 5.7 | 6.6 | 6.9 | 7.0 |

[1] Unstabilized.
[2] Initial transmission 37% caused by dry, white exudate, which became clear at 160° C.

We claim:
1. A process for exclusively transacetalyzing the acetal function of methyl 9,9-dimethoxynonanoate comprising refluxing methyl 9,9-dimethoxynonanoate with at least one equivalent excess of an alcohol selected from the group consisting of n-butanol, n-hexanol, octadecanol, and ethylene glycol for not over 4 hours at about from 50° C. to not above 75° C. in the presence of potassium acid sulfate catalyst.
2. Methyl 8-(1,3-dioxolan-2-yl)octanoate.
3. Butyl 8-(1,3-dioxolan-2-yl)octanoate.
4. 2-ethylhexyl 8-(1,3-dioxolan-2-yl)octanoate.
5. Ethylene bis[8-(1,3-dioxolan-2-yl)octanoate].
6. 2-ethylhexyl 9,9-bis(2-methoxyethoxy)nonanoate.

References Cited

FOREIGN PATENTS 846,906  8/1960  Great Britain.

ALEX MAZEL, *Primary Examiner.*

J. H. TURNIPSEED, *Assistant Examiner.*